United States Patent [19]
Lee

[11] Patent Number: 5,831,692
[45] Date of Patent: Nov. 3, 1998

[54] STACKED CAPACITOR STRUCTURES FOR LIQUID CRYSTAL DISPLAYS AND RELATED METHODS

[75] Inventor: Joo-hyung Lee, Seoul, Rep. of Korea

[73] Assignee: Samsung Electronics Co., Ltd., Kyungki-do, Rep. of Korea

[21] Appl. No.: 811,762

[22] Filed: Mar. 6, 1997

[30] Foreign Application Priority Data

Aug. 21, 1996 [KR] Rep. of Korea ...................... 96-34738

[51] Int. Cl.$^6$ ...................... G02F 1/1343; G02F 1/1333; G02F 1/136; G02F 1/135
[52] U.S. Cl. ............................. 349/38; 349/138; 349/43; 349/49
[58] Field of Search ................... 349/38, 43, 47, 349/49, 138

[56] References Cited

U.S. PATENT DOCUMENTS

| | | | |
|---|---|---|---|
| 4,742,018 | 5/1988 | Kimura et al. | 437/48 |
| 4,746,963 | 5/1988 | Uchida et al. | 357/50 |
| 5,182,661 | 1/1993 | Ikeda et al. | 349/38 |
| 5,468,684 | 11/1995 | Yoshimori et al. | 437/228 |
| 5,470,802 | 11/1995 | Gnade et al. | 437/238 |
| 5,617,229 | 4/1997 | Yamamoto et al. | 349/42 |

*Primary Examiner*—William L. Sikes
*Assistant Examiner*—Tarifur R. Chowdhury
*Attorney, Agent, or Firm*—Myers Bigel Sibley & Sajovec

[57] ABSTRACT

A liquid crystal display includes a first conductive layer on a substrate, and a first insulating layer on the first conductive layer. The first insulating layer includes a first contact hole therein exposing a portion of the first conductive layer. A second conductive layer is provided on the first insulating layer opposite the first conductive layer and adjacent the first contact hole, and a second insulating layer is provided on the second conductive layer. A third conductive layer is provided on a first portion of the second insulating layer opposite the second conductive layer and adjacent the first contact hole, and the third conductive layer extends through the first contact hole contacting the first conductive layer. A third insulating layer is provided on a second portion of the second insulating layer adjacent the first portion and opposite the second conductive layer, and a data line is provided on the third insulating layer opposite the second insulating layer and the second conductive layer. A protective layer covers the third conductive layer, the third insulating layer, and the data line, and the protective layer includes a second contact hole which exposes a portion of the third conductive layer. A pixel electrode on the protective layer extends through the second contact hole contacting the third conductive layer. Related methods are also discussed.

38 Claims, 2 Drawing Sheets

STACKED CAPACITOR STRUCTURES FOR LIQUID CRYSTAL DISPLAYS AND RELATED METHODS

FIELD OF THE INVENTION

The present invention relates to the field of liquid crystal displays and more particularly to capacitor structures for liquid crystal displays and related methods.

BACKGROUND OF THE INVENTION

In response to a demand for smaller visual displays for personal computers, flat panel displays (plane screens) have been developed. For example, liquid crystal displays (LCD), plasma display panels (PDP), and electroluminescent displays (ELD) have been developed to replace the conventional cathode ray tube (CRT) which may be bulky. In particular, significant development of liquid crystal display technologies has occurred, and some liquid crystal displays can match or exceed cathode ray tubes in color picture quality.

FIG. 1 is a cross-sectional view illustrating a conventional liquid crystal display. As shown, a first conductive layer 3 of polysilicon is formed on a substrate 1, and a first insulating layer 5 is formed on the first conductive layer 3. The first insulating layer 5 can be a gate insulating layer. A second conductive layer 7 of polysilicon is formed on the first insulating layer 5, and a second insulating layer 9 is formed on the second conductive layer 7. The third insulating layer 11 is formed on the second insulating layer 9.

In addition, a first metal layer 13 fills a contact hole in the third insulating layer 11 and the first insulating layer 5. Accordingly, the first metal layer 13 is connected to the first conductive layer 3. A second metal layer 15 is formed on the third insulating layer 11, and a protective layer 17 covers the first and second metal layers 13 and 15 and the third insulating layer 11. A via hole in the protective layer 17 exposes the first metal layer 13, and an indium tin oxide (ITO) electrode 19 is connected to the first metal layer 13 through the via hole. The second conductive layer 7 can thus be used as a gate electrode and a capacitor storage electrode. The first metal layer 13 provides a pad connecting the indium tin oxide electrode 19 with the first conductive layer 3, and the second metal layer 15 acts as a data line. The connections of a pixel electrode and a thin film transistor as well as the arrangements of upper and lower substrates of a liquid crystal display is discussed, for example in copending U.S. application Ser. No. 08/786,474 entitled "Liquid Crystal Display Devices With Increased Viewing Angle Capability And Methods Of Operating Same" to Dong-gyu Kim filed Jan. 20, 1997. The disclosure of this application is hereby incorporated herein in its entirety by reference.

In the above-mentioned liquid crystal display, however, the first conductive layer 3, the first insulating layer 5, and the second conductive layer 7 provide a storage capacitor with a storage capacitance $C_{STG1}$ which may be less than desired. Accordingly, it may be desirable to increase the storage capacitance for the liquid crystal display to increase uniformity of phase as well as reliability.

SUMMARY OF THE INVENTION

It is therefor an object of the present invention to provide improved liquid crystal displays and methods.

It is another object of the present invention to provide liquid crystal displays which can have increased uniformity of phase and related methods.

It is still another object of the present invention to provide liquid crystal displays which can have enhanced reliability and related methods.

It is yet another object of the present invention to provide liquid crystal displays which can have increased storage capacitance and related methods.

These and other objects are provided according to the present invention by liquid crystal displays including first and second storage capacitors. In particular, a first conductive layer, a first insulating layer, and a second conductive layer make up a first storage capacitor, and the second conductive layer, a second insulating layer, and a third conductive layer make up a second storage capacitor. By connecting the two storage capacitors in parallel, the total storage capacitance for the liquid crystal display can be increased thus increasing a uniformity of phase and reliability.

A liquid crystal display according to the present invention includes, the first conductive layer on a substrate, the first insulating layer on the first conductive layer, and the second conductive layer on the first insulating layer. The first insulating layer has a first contact hole therein exposing a portion of the first conductive layer, and the second conductive layer is on the first insulating layer opposite the first conductive layer and adjacent the first contact hole. The second insulating layer is provided on the second conductive layer, and the third conductive layer is provided on a first portion of the second insulating layer opposite the second conductive layer and adjacent the first contact hole. The third conductive layer also extends through the first contact hole and contacts the first conductive layer.

In addition, the liquid crystal display can include a third insulating layer on a second portion of the second insulating layer adjacent the first portion and opposite the second conductive layer, and a data line on the third insulating layer opposite the second insulating layer and the second conductive layer. The data line is thus separated from the second conductive layer by both the second and third insulating layers. Accordingly, parasitic capacitance between the data line and the second conductive layer can be reduced.

A protective layer can also be provided on the third conductive layer, the third insulating layer, and the data line wherein this protective layer includes a second contact hole which exposes a portion of the third conductive layer. Accordingly, a pixel electrode on the protective layer can extend through the second contact hole and contact the third conductive layer. The pixel electrode is thus connected to the first and third conductive layers.

In particular, the first and second conductive layers can be polysilicon layers, and the third conductive layer and the data line can each be formed from a single metal layer. The second insulating layer can be a layer of a thermal oxide formed by oxidizing the second polysilicon layer, and the third insulating layer can be an organic insulator. More particularly, the organic insulator can be a spin on glass.

Furthermore, the second insulating layer can have a thickness in the range of 700 Angstroms to 2000 Angstroms, and the third insulating layer can have a thickness in the range of 5000 Angstroms to 7000 Angstroms. Accordingly, the third conductive layer can be sufficiently close to the second conductive layer to provide increased storage capacitance, while the data line can be sufficiently spaced from the second conductive layer to reduce parasitic capacitance. In addition, the third conductive layer can extend on a portion of the third insulating layer opposite the second insulating layer.

According to an alternate aspect of the present invention, a method is provided for fabricating a liquid crystal display. This method includes the steps of forming a first conductive layer on a substrate, forming a first insulating layer on the first conductive layer, and forming a second conductive layer on a first portion of the first insulating layer opposite the first conductive layer leaving a second portion of the first insulating layer opposite the first conductive layer exposed. A second insulating layer is formed on the second conductive layer, and a third insulating layer is formed on a first portion of the second insulating layer opposite the second conductive layer leaving a second portion of the second insulating layer exposed.

A first contact hole is formed in the exposed second portion of the first insulating layer exposing a portion of the first conductive layer, and a third conductive layer is formed on the second portion of the first insulating layer and on the second portion of the second insulating layer. Moreover, the third conductive layer extends through the first contact hole contacting the first conductive layer.

In addition, a data line can be formed on the third insulating layer opposite the second insulating layer and the second conductive layer. A protective layer can also be formed on the third conductive layer, the data line, and the third insulating layer wherein the protective layer includes a second contact hole exposing a portion of the third conductive layer. Furthermore, a pixel electrode can be formed on the protective layer wherein the pixel electrode extends through the second contact hole contacting the third conductive layer.

According to the structures and methods of the present invention, liquid crystal displays with increased storage capacitance can be provided. Accordingly, the uniformity of phase and reliability can be increased.

DETAILED DESCRIPTION

Figure 1:
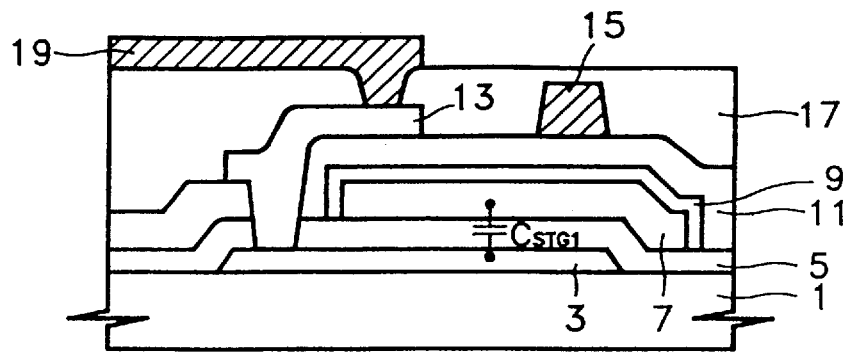
FIG. 1 is a cross sectional view illustrating a liquid crystal display according to the prior art.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thicknesses of layers and regions are exaggerated for clarity. Like numbers refer to like elements throughout.

Figure 2:
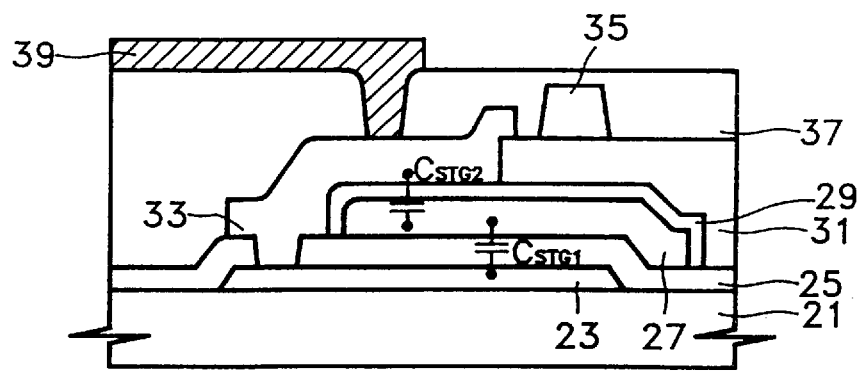
FIG. 2 is a cross sectional view illustrating a liquid crystal display according to the present invention.

A liquid crystal display (LCD) according to the present invention is illustrated in FIG. 2. As shown, the liquid crystal display includes a first conductive layer 23 of polysilicon on a substrate 21, a first insulating layer 25 on the first conductive layer 23, a second conductive layer 27 of polysilicon on the first insulating layer 25, a second insulating layer 29 on the second conductive layer 27, and a third insulating layer 31 on the second insulating layer 29. In particular, the third insulating layer 31 can be formed from an organic insulating material such as a spin-on-glass (SOG), and the second insulating layer 29 can be a thermal oxide formed by thermally oxidizing the surface of the second conductive layer 27 which provides the gate electrode. The second conductive layer 27 is used as the storage capacitor electrode as well as the gate electrode for the liquid crystal display.

A contact hole in the first insulating layer 25 exposes a portion of the first conductive layer 23, and a third conductive layer 33 fills the contact hole making contact with the first conductive layer 23. A fourth conductive layer 35 on the third insulating layer 31 provides a data line. In particular, the third and fourth conductive layers can be patterned from a single layer of metal. The liquid crystal display also includes a protective layer 37 with a via hole exposing the third conductive layer 33. An indium tin oxide (ITO) electrode 39 on the protective layer 37 fills the via hole making contact with the third conductive layer 33. The third conductive layer 33 thus acts as a pad providing a connection between the indium tin oxide electrode 39 and the storage capacitor electrode. The fourth conductive layer 35 acts as a data line.

The storage capacitance of the above-described liquid crystal display is the sum of a first storage capacitance $C_{STG1}$ and a second storage capacitance $C_{STG2}$. The first storage capacitance $C_{STG1}$ is determined by the capacitor formed by the first conductive layer 23, the first insulating layer 25, and the second conductive layer 27. The second storage capacitance $C_{STG2}$ is determined by the second capacitor formed by the second conductive layer 27, the second insulating layer 29, and the first metal layer 33. By increasing the storage capacitance, the liquid crystal display of the present invention can have enhanced uniformity of phase and increased reliability.

Figure 3:
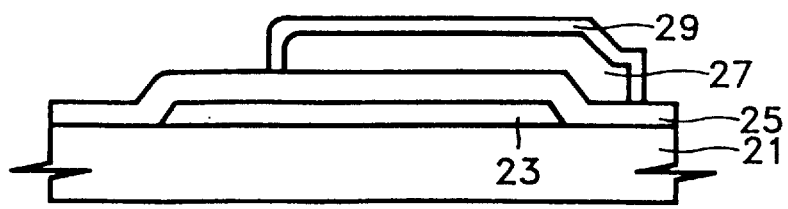
FIGS. 3 to 6 are cross sectional views illustrating steps of a method for forming the liquid crystal display of FIG. 2.

A method for fabricating a liquid crystal display according to the present invention is illustrated with reference to FIGS. 3 through 6. A patterned layer of polysilicon is formed on the substrate 21 to provide a first conductive layer 23 for an active region, as shown in FIG. 3. A first insulating layer 25 is formed on the surface of the substrate 21 and the first conductive layer 23 to provide a gate insulating layer. A patterned polysilicon layer is formed on the first insulating layer 25 to provide the second conductive layer 27. The second conductive layer 27 provides a storage capacitor electrode and a gate electrode. The second conductive layer 27 is then thermally oxidized to form the second insulating layer 29 which is an oxide. The second insulating layer 29 is preferably formed to a thickness in the range of 700 Å to 2000 Å.

Figure 4:
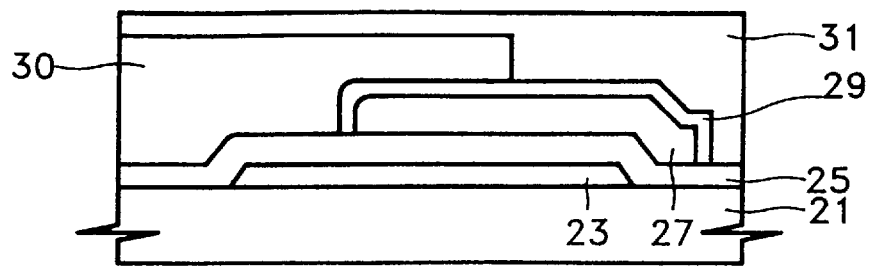
Figure 5:
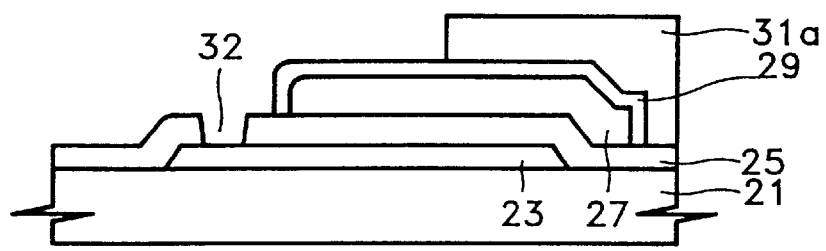

Photoresist is then coated on the substrate 21 covering the first and second insulating layers 25 and 29. As shown in FIG. 4, the photoresist is patterned to provide a mask layer 30 which covers portions of the first and second insulating layers 25 and 29. In particular, the mask layer 30 exposes portions of the second insulating layer 29 on which the third insulating layer 31 is to be formed. The mask pattern 30 covers portions of the second insulating layer 29 on which the third conductive layer is to be formed. The third insulating layer 31 can be formed from an organic insulating material such as spin-on-glass (SOG), and this third insulating layer 31 is formed on the mask layer 30 as well as the second insulating layer 29. The third insulating layer 31 is preferably formed to a thickness in the range of 500 Å to 1000 Å on the mask layer 30, into a thickness in the range of 5000 Å to 7000 Å in the second insulating layer 29.

The third insulating layer 31 is then etched back using the mask pattern 30 as an etch stopping point thus forming the second patterned insulating layer 31A, and the mask layer 30 from FIG. 4 is removed. The first insulating layer 25 is then etched using a photolithographic technique, to form a contact hole 32 exposing the surface of the first conductive layer 23.

A metal layer is deposited on the exposed portions of the first insulating layer 25, the second insulating layer 29, and the third insulating layer 31A, and this metal layer is patterned to form the third conductive layer 33 and the fourth conductive layer 35. The third conductive layer 33 is connected to the first conductive layer 23, and the fourth conductive layer 35 is formed on the third insulating layer 31A. The third conductive layer 33 provides a storage capacitor electrode, and the fourth conductive layer 35 provides the data line.

In addition, a protective layer is formed on the exposed portions of the third conductive layer 33, the fourth conductive layer 35, the third insulating layer 31A, and the first insulating layer 25. This protective layer is then patterned to provide a via hole exposing a portion of the third conductive layer 33. A pixel electrode 39 is then formed on the protective layer 37, and the pixel electrode 39 is connected to the third conductive layer 33 through the via hole. In particular, the pixel electrode 39 can be formed from indium tin oxide (ITO).

Figure 6:
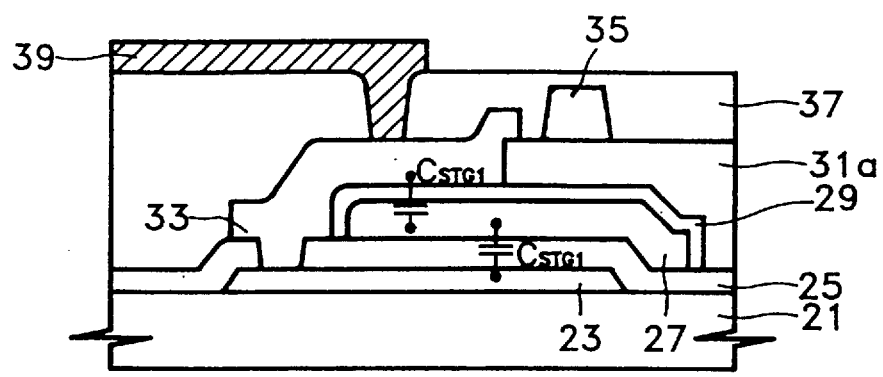

The storage capacitance of the liquid crystal display discussed above is thus the sum of the first storage capacitance $C_{STG1}$ and the second storage capacitance $C_{STG2}$. As shown in FIG. 6, the first storage capacitance is determined by the first conductive layer 23, the first insulating layer 25, and the second conductive layer 27. The second storage capacitance is determined by the second conductive layer 27, the second insulating layer 29, and the third conductive layer 33. Accordingly, the storage capacitance of the liquid crystal display of the present invention can be larger than that of a conventional liquid crystal display having only the first storage capacitance.

In addition, the thickness of the insulating layer between the fourth conductive layer 35 making up the data line and the second conductive layer 27 can be as great as 6000 Å A to 7000 Å A, while the distance between the third conductive layer 33 and the second conductive layer 27 can be as low as 700 Å A to 2000 Å A. Accordingly, the second storage capacitance can be provided thus increasing the overall storage capacitance without significantly increasing parasitic capacitance between the data line and the second conductive layer.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A liquid crystal display comprising:
    a first conductive layer on a substrate;
    a first insulating layer on said first conductive layer, wherein said first insulating layer includes a first contact hole therein exposing a portion of said first conductive layer;
    a second conductive layer on said first insulating layer opposite said first conductive layer and adjacent said first contact hole;
    a second insulating layer on said second conductive layer;
    a third conductive layer on a first portion of said second insulating layer opposite said second conductive layer and adjacent said first contact hole wherein said third conductive layer extends through said first contact hole contacting said first conductive layer;
    a third insulating layer on a second portion of said second insulating layer adjacent said first portion and opposite said second conductive layer;
    a data line on said third insulating layer opposite said second insulating layer and said second conductive layer;
    a protective layer on said third conductive layer, said third insulating layer, and said data line wherein said protective layer includes a second contact hole which exposes a portion of said third conductive layer; and
    a pixel electrode on said protective layer wherein said pixel electrode extends through said second contact hole contacting said third conductive layer.

2. A liquid crystal display according to claim 1 wherein said first and second conductive layers comprise polysilicon layers.

3. A liquid crystal display according to claim 1 wherein said third conductive layer and said data line each comprise a metal layer.

4. A liquid crystal display according to claim 1 wherein said second insulating layer comprises a thermal oxide.

5. A liquid crystal display according to claim 1 wherein said third insulating layer comprises an organic insulator.

6. A liquid crystal display according to claim 5 wherein said organic insulator comprises spin on glass.

7. A liquid crystal display according to claim 1 wherein said second insulating layer has a thickness in the range of 700 ÅAngstroms to 2000 ÅAngstroms, and said third insulating layer has a thickness in the range of 5000 ÅAngstroms to 7000 ÅAngstroms.

8. A liquid crystal display according to claim 1 wherein said third conductive layer extends on a portion of said third insulating layer opposite said second insulating layer.

9. A method for fabricating a liquid crystal display, said method comprising the steps of:
    forming a first conductive layer on a substrate;
    forming a first insulating layer on said first conductive layer;
    forming a second conductive layer on a first portion of said first insulating layer opposite said first conductive layer leaving a second portion of said first insulating layer opposite said first conductive layer exposed;
    forming a second insulating layer on said second conductive layer;
    forming a third insulating layer on a first portion of said second insulating layer opposite said second conductive layer leaving a second portion of said second insulating layer exposed;
    forming a first contact hole in said exposed second portion of said first insulating layer exposing a portion of said first conductive layer;
    forming a third conductive layer on said second portion of said first insulating layer and on said second portion of said second insulating layer wherein said third conductive layer extends through said first contact hole contacting said first conductive layer;
    forming a data line on said third insulating layer opposite said second insulating layer and said second conductive layer;
    forming a protective layer on said third conductive layer, said data line, and said third insulating layer wherein said protective layer includes a second contact hole which exposes a portion of said third conductive layer; and forming a pixel electrode on said protective layer wherein said pixel electrode extends through said second contact hole contacting said third conductive layer.

10. A method according to claim 9 wherein said step of forming said third insulating layer comprises the steps of:
   forming a patterned masking layer on said second portion of said first conductive layer and on said second portion of said second insulating layer;
   forming said third insulating layer on said first portion of said second insulating layer and on said patterned masking layer;
   etching said third insulating layer back using said patterned masking layer as an etch stopping point; and
   removing said patterned masking layer.

11. A method according to claim 10 wherein said patterned masking layer comprises a patterned photoresist layer.

12. A method according to claim 10 wherein said third conductive layer and said data line are patterned from a single layer of metal.

13. A method according to claim 9 wherein said step of forming said second insulating layer comprises forming a layer of an oxide.

14. A method according to claim 9 wherein said step of forming said third insulating layer comprises forming a layer of an organic insulator.

15. A method according to claim 14 wherein said organic insulator comprises a spin on glass.

16. A method according to claim 9 wherein said second insulating layer has a thickness in the range of 700 ÅAngstroms to 2000 ÅAngstroms, and said third insulating layer has a thickness in the range of 5000 ÅAngstroms to 7000 ÅAngstroms.

17. A method according to claim 9 wherein said step of forming said second insulating layer comprises oxidizing a surface of said second conductive layer.

18. A method according to claim 9 wherein said third conductive layer extends on a portion of said third insulating layer opposite said second insulating layer.

19. A capacitor structure for a liquid crystal display, said capacitor structure comprising:
   a first conductive layer on a substrate;
   a first insulating layer on said first conductive layer, wherein said first insulating layer includes a first contact hole therein exposing a portion of said first conductive layer;
   a second conductive layer on said first insulating layer opposite said first conductive layer and adjacent said first contact hole;
   a second insulating layer on said second conductive layer;
   a third conductive layer on a first portion of said second insulating layer opposite said second conductive layer and adjacent said first contact hole wherein said third conductive layer extends through said first contact hole contacting said first conductive layer;
   a third insulating layer on a second portion of said second insulating layer adjacent said first portion and opposite said second conductive layer; and
   a data line on said third insulating layer opposite said second insulating layer and said second conductive layer.

20. A capacitor structure according to claim 19 wherein said third conductive layer and said data line each comprise a metal layer.

21. A capacitor structure according to claim 19 further comprising:
   a protective layer on said third conductive layer, said third insulating layer, and said data line wherein said protective layer includes a second contact hole which exposes a portion of said third conductive layer; and
   a pixel electrode on said protective layer wherein said pixel electrode extends through said second contact hole contacting said third conductive layer.

22. A capacitor structure according to claim 19 wherein said first and second conductive layers comprise polysilicon layers.

23. A capacitor structure according to claim 19 wherein said second insulating layer comprises an oxide.

24. A capacitor structure according to claim 19 wherein said third insulating layer comprises an organic insulator.

25. A capacitor structure according to claim 24 wherein said organic insulator comprises spin on glass.

26. A capacitor structure according to claim 19 wherein said third conductive layer extends on a portion of said third insulating layer opposite said second insulating layer.

27. A capacitor structure for a liquid crystal display, said capacitor structure comprising:
   a first conductive layer on a substrate;
   a first insulating layer on said first conductive layer, wherein said first insulating layer includes a first contact hole therein exposing a portion of said first conductive layer;
   a second conductive layer on said first insulating layer opposite said first conductive layer and adjacent said first contact hole;
   a second insulating layer on said second conductive layer;
   a third conductive layer on a first portion of said second insulating layer opposite said second conductive layer and adjacent said first contact hole wherein said third conductive layer extends through said first contact hole contacting said first conductive layer; and
   a third insulating layer on a second portion of said second insulating layer adjacent said first portion and opposite said second conductive layer wherein said second insulating layer has a thickness in the range of 700 ÅAngstroms to 2000 ÅAngstroms, and said third insulating layer has a thickness in the range of 5000 ÅAngstroms to 7000 ÅAngstroms.

28. A method for fabricating a capacitor structure for a liquid crystal display, said method comprising the steps of:
   forming a first conductive layer on a substrate;
   forming a first insulating layer on said first conductive layer;
   forming a second conductive layer on a first portion of said first insulating layer opposite said first conductive layer leaving a second portion of said first insulating layer opposite said first conductive layer exposed;
   forming a second insulating layer on said second conductive layer;
   forming a third insulating layer on a first portion of said second insulating layer opposite said second conductive layer leaving a second portion of said second insulating layer exposed;
   forming a first contact hole in said exposed second portion of said first insulating layer exposing a portion of said first conductive layer; forming a third conductive layer on said second portion of said first insulating layer and on said second portion of said second insulating layer wherein said third conductive layer extends through said first contact hole contacting said first conductive layer; and forming a data line on said third insulating layer opposite said second insulating layer and said second conductive layer.

29. A method according to claim 28 wherein said third conductive layer and said data line are patterned from a single layer of metal.

30. A method according to claim 28 further comprising the steps of:
   forming a protective layer on said third conductive layer, said data line, and said third insulating layer wherein said protective layer includes a second contact hole which exposes a portion of said third conductive layer; and
   forming a pixel electrode on said protective layer wherein said pixel electrode extends through said second contact hole contacting said third conductive layer.

31. A method according to claim 28 wherein said step of forming said third insulating layer comprises the steps of:
   forming a patterned masking layer on said second portion of said first conductive layer and on said second portion of said second insulating layer;
   forming said third insulating layer on said first portion of said second insulating layer and on said patterned masking layer;
   etching said third insulating layer back using said patterned masking layer as an etch stopping point; and
   removing said patterned masking layer.

32. A method according to claim 31 wherein said patterned masking layer comprises a patterned photoresist layer.

33. A method according to claim 28 wherein said step of forming said second insulating layer comprises forming a layer of an oxide.

34. A method according to claim 28 wherein said step of forming said third insulating layer comprises forming a layer of an organic insulator.

35. A method according to claim 34 wherein said organic insulator comprises a spin on glass.

36. A method according to claim 28 wherein said step of forming said second insulating layer comprises oxidizing a surface of said second conductive layer.

37. A method according to claim 28 wherein said third conductive layer extends on a portion of said third insulating layer opposite said second insulating layer.

38. A method for fabricating a capacitor structure for a liquid crystal display, said method comprising the steps of:
   forming a first conductive layer on a substrate;
   forming a first insulating layer on said first conductive layer;
   forming a second conductive layer on a first portion of said first insulating layer opposite said first conductive layer leaving a second portion of said first insulating layer opposite said first conductive layer exposed;
   forming a second insulating layer on said second conductive layer;
   forming a third insulating layer on a first portion of said second insulating layer opposite said second conductive layer leaving a second portion of said second insulating layer exposed;
   forming a first contact hole in said exposed second portion of said first insulating layer exposing a portion of said first conductive layer; and
   forming a third conductive layer on said second portion of said first insulating layer and on said second portion of said second insulating layer wherein said third conductive layer extends through said first contact hole contacting said first conductive layer wherein said second insulating layer has a thickness in the range of 700 ÅAngstroms to 2000 ÅAngstroms, and said third insulating layer has a thickness in the range of 5000 ÅAngstroms to 7000 ÅAngstroms.

* * * * *

UNITED STATES PATENT AND TRADEMARK OFFICE
CERTIFICATE OF CORRECTION

PATENT NO.      :   5,831,692

DATED           :   November 3, 1998

INVENTOR(S)     :   Lee

It is certified that error appears in the above-identified patent and that said Letters Patent is hereby corrected as shown below:

In the claims:

In Claim 7: Replace all occurrences of "ÅAngstroms" with --Angstroms--.

In Claim 16: Replace all occurrences of "ÅAngstroms" with --Angstroms--.

In Claim 27, Replace all occurrences of "ÅAngstroms" with --Angstroms--.

In Claim 38: Replace all occurrences of "ÅAngstroms" with --Angstroms--.

Signed and Sealed this

Seventeenth Day of August, 1999

Attest:

Q. TODD DICKINSON

*Attesting Officer*      *Acting Commissioner of Patents and Trademarks*